United States Patent
Konishi et al.

(10) Patent No.: US 11,377,198 B2
(45) Date of Patent: Jul. 5, 2022

(54) UNMANNED FLYING OBJECT

(71) Applicant: Panasonic Intellectual Property Corporation of America, Torrance, CA (US)

(72) Inventors: Kazunobu Konishi, Osaka (JP); Stephen William John, Nara (JP); Katsuhiko Asai, Nara (JP); Ko Mizuno, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 948 days.

(21) Appl. No.: 16/147,937

(22) Filed: Oct. 1, 2018

(65) Prior Publication Data

US 2019/0106204 A1   Apr. 11, 2019

Related U.S. Application Data

(60) Provisional application No. 62/569,168, filed on Oct. 6, 2017.

(30) Foreign Application Priority Data

May 30, 2018 (JP) ................. 2018-103915

(51) Int. Cl.
*B64C 11/00* (2006.01)
*B64C 39/02* (2006.01)
*G10K 11/178* (2006.01)

(52) U.S. Cl.
CPC .......... *B64C 11/001* (2013.01); *B64C 39/024* (2013.01); *G10K 11/17823* (2018.01);
(Continued)

(58) Field of Classification Search
CPC ........ B64C 2220/00; G10K 2210/1281; G10K 2210/109
See application file for complete search history.

(56) References Cited

U.S. PATENT DOCUMENTS

| | | | | |
|---|---|---|---|---|
| 6,078,671 A | * | 6/2000 | Kawanishi | ............. F01N 1/065 381/71.5 |
| 2007/0200027 A1 | | 8/2007 | Johnson | |

(Continued)

FOREIGN PATENT DOCUMENTS

| | | |
|---|---|---|
| JP | 2-202200 A | 8/1990 |
| JP | 11-338478 A | 12/1999 |

(Continued)

*Primary Examiner* — Nicholas McFall
(74) *Attorney, Agent, or Firm* — Greenblum & Bernstein, P.L.C.

(57) ABSTRACT

An unmanned flying object, capable of suppressing an increase in overall size while having a configuration to reduce noise, is provided. The unmanned flying object includes a duct that corresponds to: at least one generator that generates airflow; at least one microphone; and at least one speaker. The duct covers the at least one generator in a direction perpendicular to an airflow direction, passes the airflow in the airflow direction, includes a space between inner and outer peripheral surfaces, and defines an opening at the end of the space in the airflow direction. A shape of the inner peripheral surface is tapered in the airflow direction. The at least one microphone is positioned in the space. The at least one speaker is positioned closer to the at least one generator than the at least one microphone.

13 Claims, 6 Drawing Sheets

(52) U.S. Cl.
CPC .. *G10K 11/17857* (2018.01); *G10K 11/17875* (2018.01); *B64C 2201/027* (2013.01); *B64C 2201/108* (2013.01); *B64C 2201/162* (2013.01); *B64C 2220/00* (2013.01); *G10K 2210/109* (2013.01); *G10K 2210/1281* (2013.01)

(56) References Cited

U.S. PATENT DOCUMENTS

| | | |
|---|---|---|
| 2012/0018117 A1 | 1/2012 | Yamada et al. |
| 2016/0379619 A1 | 12/2016 | Sugaya |
| 2018/0170535 A1 | 6/2018 | Sato et al. |

FOREIGN PATENT DOCUMENTS

| | | |
|---|---|---|
| JP | 2007-171487 A | 7/2007 |
| JP | 2013-137192 A | 7/2013 |
| JP | 2017-009965 A | 1/2017 |
| JP | 2017-129322 | 7/2017 |
| WO | 2016/048897 A1 | 3/2016 |
| WO | 2016/170565 A1 | 10/2016 |
| WO | 2017/048464 A1 | 3/2017 |

\* cited by examiner

UNMANNED FLYING OBJECT

BACKGROUND

1. Technical Field

The present disclosure relates to an unmanned flying object.

2. Description of the Related Art

Japanese Unexamined Patent Application Publication No. 2017-129322 proposes a blower that achieves a silencing effect. The blower disclosed in Japanese Unexamined Patent Application Publication No. 2017-129322 includes an active silencer, and the active silencer includes a microphone and a speaker.

SUMMARY

However, the invention disclosed in Japanese Unexamined Patent Application Publication No. 2017-129322 might increase the overall size of the device including the microphone and the speaker used to reduce noise. For example, when an unmanned flying object includes such a microphone and a speaker, the overall size of the unmanned flying object might be increased.

One non-limiting and exemplary embodiment provides an unmanned flying object capable of suppressing an increase in overall size while having a configuration to reduce noise.

In one general aspect, the techniques disclosed here feature an unmanned flying object including: a duct and a processor. The duct corresponds to: at least one generator that generates force to fly the unmanned flying object and generates airflow; at least one microphone; and at least one speaker. The processor generates a second signal according to a first signal output from the at least one microphone. The duct covers the at least one generator in a direction perpendicular to an airflow direction that is a direction in which the airflow is generated by the at least one generator, passes the airflow in the airflow direction, includes a space between an inner peripheral surface and an outer peripheral surface, and defines an opening at the end of the space in the airflow direction. A shape of the inner peripheral surface of the duct is tapered in the airflow direction, the at least one microphone is positioned in the space of the duct, the at least one speaker is positioned closer to the at least one generator than the at least one microphone, and the at least one speaker outputs a sound according to the second signal.

The unmanned flying object according to one aspect of the present disclosure can suppress an increase in overall size while having a configuration to reduce noise.

It should be noted that general or specific embodiments may be implemented as a system, an apparatus, a method, an integrated circuit, a computer program, a computer-readable non-transitory recording medium such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION (Underlying Knowledge Forming Basis of the Present Disclosure)

In recent years, unmanned flying objects also referred to as drones, unmanned aircraft or unmanned aerial vehicles (UAVs) are beginning to be used in various fields. For example, unmanned flying objects are assumed to be useful in shooting, delivering packages, searching for a missing person or the like, spraying chemicals, and the like.

On the other hand, such unmanned flying objects generate a lot of noise in flying. For example, noise is generated by the rotation of a propeller mounted on an unmanned flying object. To be more specific, as the propeller rotates, one of blades of the propeller generates a wingtip vortex. This wingtip vortex hits against the other blades of the propeller, thereby generating noise.

For this reason, there may be restrictions put on the use of unmanned flying objects that generate a lot of noise. For example, the use of unmanned flying objects may be restricted in a quiet environment such as a hospital and a library, at quiet hours such as during the night, in areas where people are close by, and the like.

Therefore, for example, it is assumed to be advantageous to suppress the noise of unmanned flying objects by active noise canceling. The active noise canceling is a technology to actively suppress noise, such as sound noise, with antiphase sound. The antiphase sound of noise is a sound having a phase opposite to that of the noise and having a waveform obtained by inverting the waveform of the noise.

To be more specific, noise is acquired with a microphone, and an antiphase sound of the noise is outputted from a speaker. The noise is canceled by the antiphase sound of the noise outputted from the speaker. In order to apply such active noise canceling, the microphone and the speaker can be mounted on an unmanned flying object.

However, as wind generated by the propeller hits against the microphone, wind noise may be picked up by the microphone. More specifically, noise different from the noise to be suppressed by the active noise canceling may be picked up by the microphone. Therefore, the noise generated by the propeller may not be properly acquired. As a result, the noise to be suppressed may not be properly suppressed.

In this regard, it is conceivable, for example, that the propeller is covered with a duct and the microphone is disposed outside the duct, so that the wind generated by the propeller does not hit against the microphone. However, when the conventional technology is applied to the unmanned flying object, the unmanned flying object has an additional space outside the duct to dispose the microphone, leading to an increase in overall size of the unmanned flying object. Such an increase in overall size of the unmanned flying object increases the weight of the unmanned flying object. Also, such a space provided outside the duct to dispose the microphone increases air resistance.

A heavy unmanned flying object prevents smooth flight and increases energy consumed in flight. It is difficult for the unmanned flying object to acquire energy required to fly from outside during flight. Therefore, the heavy unmanned flying object prevents long flight. Also, increased air resistance degrades flight performance.

An unmanned flying object according to an aspect of the present disclosure is an unmanned flying object including: a duct and a processor. The duct corresponds to: at least one generator that generates force to fly the unmanned flying object and generates airflow; at least one microphone; and at least one speaker. The processor generates a second signal according to a first signal output from the at least one microphone. The duct covers the at least one generator in a direction perpendicular to an airflow direction that is a direction in which the airflow is generated by the at least one generator, passes the airflow in the airflow direction, includes a space between an inner peripheral surface and an outer peripheral surface, and defines an opening at the end of the space in the airflow direction. A shape of the inner peripheral surface of the duct is tapered in the airflow direction, the at least one microphone is positioned in the space of the duct, the at least one speaker is positioned closer to the at least one generator than the at least one microphone, and the at least one speaker outputs a sound according to the second signal.

Accordingly, the microphone is disposed at a position where wind noise is unlikely to be picked up. Moreover, the microphone does not have to be disposed outside the duct. Therefore, the unmanned flying object can suppress an increase in overall size while having a configuration to reduce noise.

In the unmanned flying object of the present disclosure, a position of the at least one microphone may correspond to a position in the space at the end of the duct in the airflow direction.

Accordingly, the microphone is disposed at a position that is easily reached by noise and where wind noise is unlikely to be picked up. Therefore, the unmanned flying object can use active noise canceling to more clearly acquire noise to be suppressed.

In the unmanned flying object of the present disclosure, the at least one microphone may be positioned in a region of the space where a distance to the outer peripheral surface is shorter than a distance to the inner peripheral surface.

Accordingly, the microphone is disposed at a position away from the inner peripheral surface of the duct. The inner peripheral surface of the duct is likely to vibrate with the airflow. Therefore, when the microphone is disposed at a position close to the inner peripheral surface of the duct, a vibration sound might be picked up by the microphone, and thus the noise to be suppressed might be mixed with the vibration sound. The unmanned flying object can suppress the above vibration sound from being picked up by the microphone and thus can more clearly acquire the noise to be suppressed.

In the unmanned flying object of the present disclosure, the at least one microphone may be fixed, through a connector, to at least one of the inner peripheral surface and the outer peripheral surface of the duct.

Accordingly, the vibration of the duct becomes less likely to be transmitted to the microphone, and thus the vibration sound of the duct is suppressed from being picked up by the microphone. Therefore, the unmanned flying object can use active noise canceling to more clearly acquire the noise to be suppressed.

In the unmanned flying object of the present disclosure, the connector may be an elastic body.

Accordingly, the vibration of the duct is further suppressed from being transmitted to the microphone, and thus the vibration sound of the duct is further suppressed from being picked up by the microphone. Therefore, the unmanned flying object can use active noise canceling to more clearly acquire the noise to be suppressed.

In the unmanned flying object of the present disclosure, the at least one microphone may be fixed to the outer peripheral surface of the duct.

Accordingly, the microphone is fixed to the outer peripheral surface that is less likely to vibrate than the inner peripheral surface. Therefore, the unmanned flying object can suppress the vibration sound from being picked up by the microphone, and can use active noise canceling to more clearly acquire the noise to be suppressed.

It should be noted that general or specific embodiments may be implemented as a system, an apparatus, a method, an integrated circuit, a computer program, a computer-readable non-transitory recording medium such as a CD-ROM, or any selective combination thereof.

Hereinafter, an embodiment is described in detail with reference to the drawings. It should be noted that the embodiment described below represents a general or specific example of the present disclosure. The numerical values, shapes, materials, components, the arrangement and connection mode of the components, steps, the order of the steps and the like described in the following embodiment are mere examples, and therefore do not limit the scope of claims. Among the components in the following embodiment, components not described in the independent claim defining the broadest concept of the present disclosure are described as optional components.

Moreover, the respective figures used in the following description are schematic diagrams and are not necessarily precise illustrations of arrangement, sizes, and the like of the respective components.

Embodiment

Figure 1:
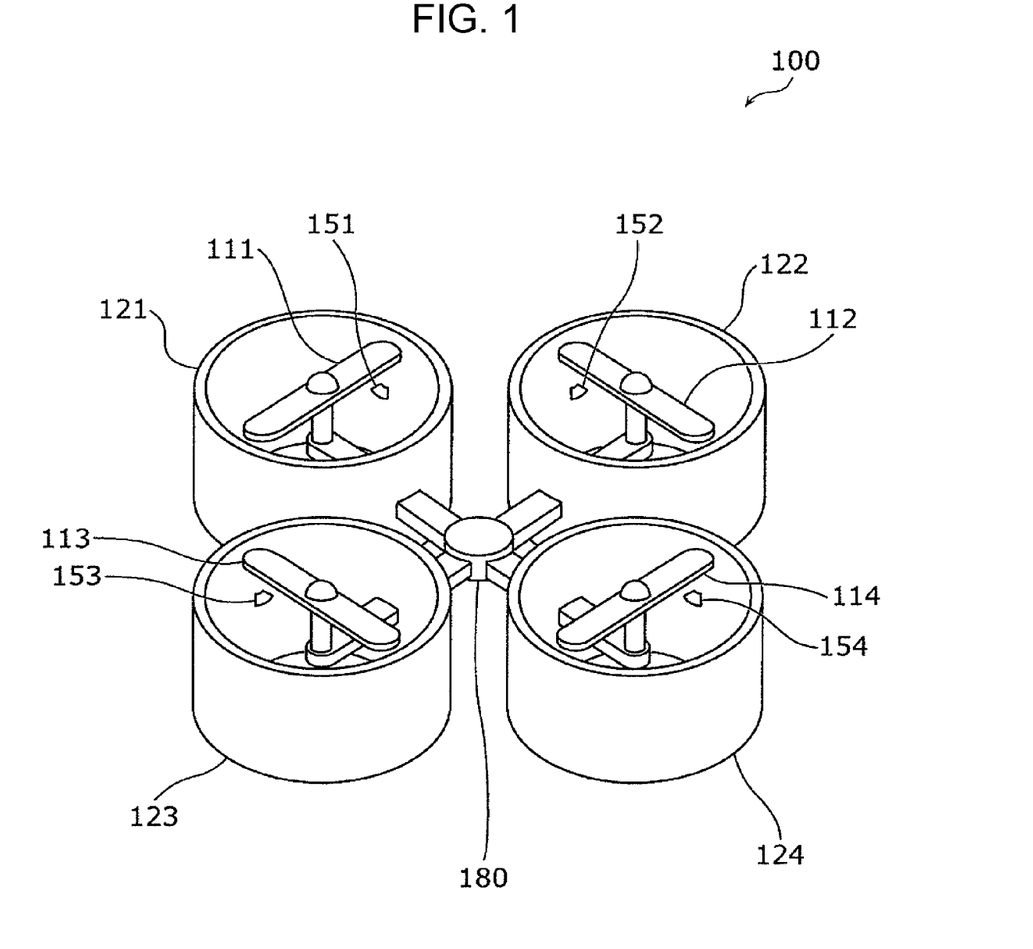
FIG. 1 is an external view of an unmanned flying object according to an embodiment.

FIG. 1 is an external view of an unmanned flying object according to this embodiment. In FIG. 1, an unmanned flying object 100 includes generators 111 to 114, ducts 121 to 124, speakers 151 to 154, and a housing 180.

Figure 2:
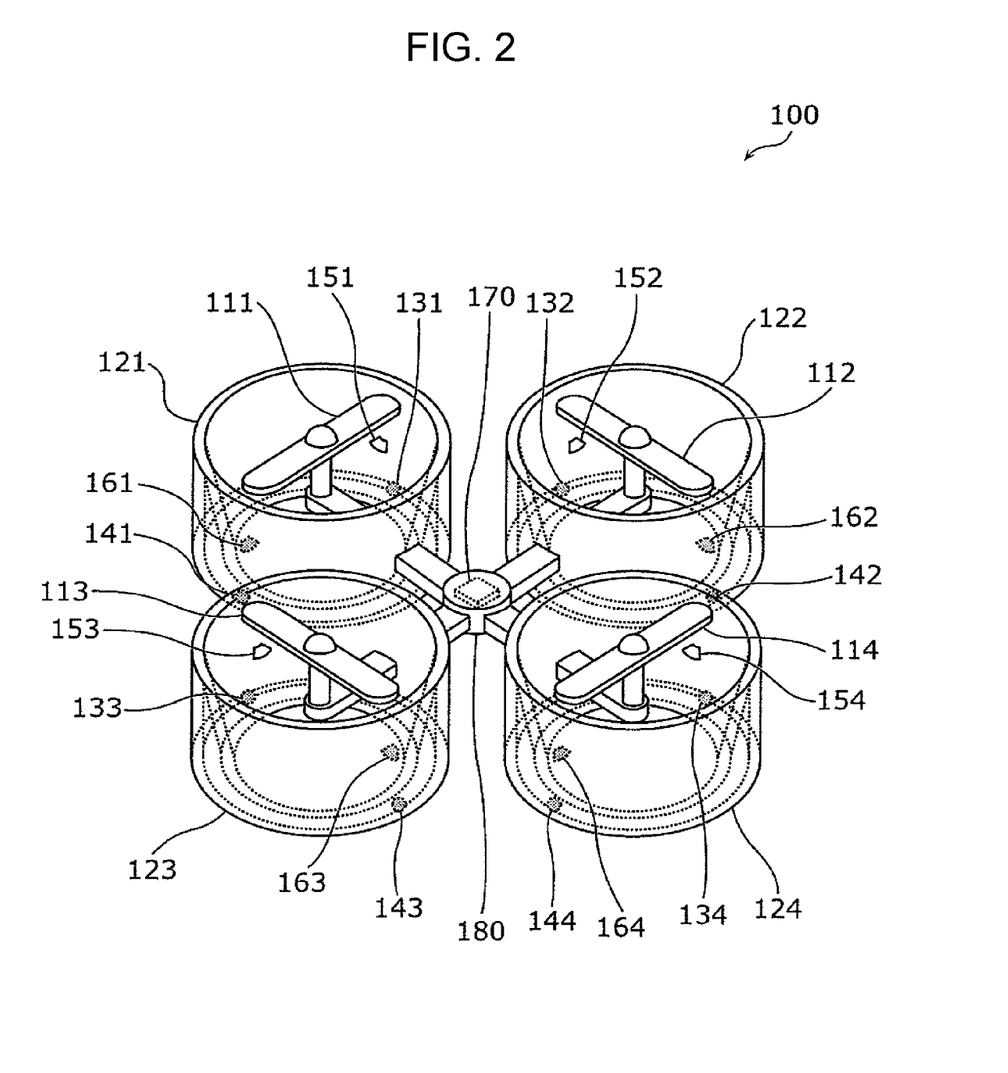
FIG. 2 is a partial perspective view illustrating a configuration of the unmanned flying object according to the embodiment.

FIG. 2 is a partial perspective view illustrating a configuration of the unmanned flying object 100 illustrated in FIG. 1. FIG. 2 illustrates components not illustrated in FIG. 1. To be more specific, the unmanned flying object 100 further includes microphones 131 to 134 and 141 to 144, speakers 161 to 164, and a processor 170. The unmanned flying object 100 may further include an image-taking device.

The generators 111 to 114, the ducts 121 to 124, the housing 180, and the like included in the unmanned flying object 100 are connected by at least one supporting structure and physically supported by at least one supporting structure so that relative arrangement thereof is maintained.

The generators 111 to 114 generate force to fly the unmanned flying object 100. For example, each of the generators 111 to 114 is a machine including an actuator, a structure, and the like, and is at least one rotor blade. Also, the generators 111 to 114 may each include a power source such as a motor.

To be more specific, the generators 111 to 114 generate force individually. The force to fly the unmanned flying object 100 includes a plurality of forces individually generated by the generators 111 to 114. The force to fly the unmanned flying object 100 is also referred to as the force obtained by combining the plurality of forces individually generated by the generators 111 to 114 for the entirety of the generators 111 to 114. These forces can be expressed as the lift force to move the unmanned flying object 100 in a vertical direction, that is, to lift the unmanned flying object 100, or as the thrust force to move the unmanned flying object 100 in a horizontal direction, that is, in front-back and left-right directions.

Moreover, each of the generators 111 to 114 generates an airflow in a direction opposite to the direction of the forces individually generated. The direction in which the airflow is generated by each of the generators 111 to 114 can also be expressed as the airflow direction.

The direction of the forces individually generated by the generators 111 to 114 may differ among the generators 111 to 114. Accordingly, the airflow direction may differ among the generators 111 to 114. Moreover, the forces individually generated by the generators 111 to 114 can also be expressed as components of the force to fly the unmanned flying object 100. More specifically, the respective generators 111 to 114 generate the components of the force to fly the unmanned flying object 100 in the direction opposite to the airflow direction.

Here, the airflow direction is one main direction of the airflow, which is a direction from the upstream side toward the downstream side. For example, the respective generators 111 to 114 generate force in a direction toward above the unmanned flying object 100 and generate force in a direction toward below the unmanned flying object 100, during the flight of the unmanned flying object 100. The direction toward above does not necessarily have to be right above. Also, the direction toward below does not necessarily have to be right below.

To be more specific, in the unmanned flying object 100, when each of the generators 111 to 114 includes at least one rotor blade, the rotation of each rotor blade generates the lift force above and generates airflows below. Here, the directions of the airflow and force generated by the rotor blade are opposite to each other along the axis of the rotor blade.

Then, the unmanned flying object 100 is lifted up by the lift force generated above. The unmanned flying object 100 also generates thrust force in any of the front-back and left-right directions by rotating the rotor blade of at least one of the generators 111 to 114 at a rotation speed different from those of the other generators. In this event, noise is generated by the rotation of each rotor blade.

Note that each of the generators 111 to 114 can also be expressed as a force generator, an airflow generator or a propeller.

Each of the ducts 121 to 124 is a structure with an airway through which air passes. Each of the ducts 121 to 124 can also be expressed as a pipe, a tube, a circular structure or a cylindrical structure. For example, each of the ducts 121 to 124 is a linear pipe, that is, a straight pipe. Also, each of the ducts 121 to 124 may be a circular pipe having a circular cross-sectional shape, or may be a square pipe having a square cross-sectional shape. Moreover, the cross-sectional shape may be a triangular shape, a hexagonal shape or any other shape.

Moreover, the ducts 121 to 124 have the same shape in FIGS. 1 and 2, but may have different shapes from each other. Furthermore, an arbitrary material can be used for the ducts 121 to 124. To be more specific, metal, resin, wood or any other material may be used. Alternatively, a sound insulation material, a sound absorbing material, a combination thereof may be used.

Moreover, the ducts 121 to 124 correspond to the generators 111 to 114, respectively. In other words, at least one of the generators 111 to 114 is set for each of the ducts 121 to 124. For example, the ducts 121 to 124 may correspond one-on-one to the generators 111 to 114. Here, the duct 121 corresponds to the generator 111, the duct 122 corresponds to the generator 112, the duct 123 corresponds to the generator 113, and the duct 124 corresponds to the generator 114.

The duct 121 covers the generator 111 and passes an airflow along the airflow direction in which the airflow is generated by the generator 111. More specifically, the duct 121 has the generator 111 included in the airway of the duct 121, and the airway of the duct 121 is along the airflow direction in which the airflow is generated by the generator 111. Also, for efficient application of active noise canceling and reduction in weight of the duct 121, the duct 121 is configured such that a portion thereof corresponding to the downstream side of the generator 111 is longer than a portion thereof corresponding to the upstream side of the generator 111.

Moreover, the duct 121 may have a length that is ⅓ to twice the width of the duct 121, for example. This range is an example, and the length of the duct 121 does not have to be limited to this range. Furthermore, the length of the duct 121 is the length thereof in the airflow direction, while the width of the duct 121 is the width thereof in a direction perpendicular to the airflow direction.

Moreover, an inner peripheral surface of the duct 121 has a tapered shape according to the airflow direction. That is, the airway covered by the inner peripheral surface of the duct 121 is tapered in the airflow direction. In other words, as for the cross-section of the airway covered by the inner peripheral surface of the duct 121, the closer to the downstream-side end of the duct 121, the smaller the cross-section. In more other words, the closer to the downstream-side end of the duct 121, the smaller the inner diameter of the duct 121.

The duct 121 also has a space between the inner peripheral surface and outer peripheral surface of the duct 121. This space has an opening at the end of the duct 121 in the airflow direction. In other words, the space is not closed but opened at the downstream-side end of the duct 121.

Alternatively, the space may be completely or partially opened at the downstream-side end of the duct 121. For example, at the downstream-side end of the duct 121, a hole, a slit or the like may be provided, which is communicated with the space from outside the duct 121. Alternatively, the space may be provided in a part of the space between the inner and outer peripheral surfaces of the duct 121, rather than throughout the space therebetween. For example, the space may be closer to the downstream-side end of the duct 121 than to the upstream-side end of the duct 121.

Likewise, the duct 122 covers the generator 112 and passes an airflow along the airflow direction in which the airflow is generated by the generator 112. Also, an inner peripheral surface of the duct 122 has a tapered shape, and there is a space between the inner peripheral surface and outer peripheral surface of the duct 122.

Likewise, the duct 123 covers the generator 113 and passes an airflow along the airflow direction in which the airflow is generated by the generator 113. Also, an inner peripheral surface of the duct 123 has a tapered shape, and there is a space between the inner peripheral surface and outer peripheral surface of the duct 123.

Likewise, the duct 124 covers the generator 114 and passes an airflow along the airflow direction in which the airflow is generated by the generator 114. Also, an inner peripheral surface of the duct 124 has a tapered shape, and there is a space between the inner peripheral surface and outer peripheral surface of the duct 124.

Each of the microphones 131 to 134 and 141 to 144 is a device that acquires a sound, converts the acquired sound into a signal, and outputs the signal. That is, the microphones 131 to 134 and 141 to 144 each acquire a sound and outputs a signal indicating the acquired sound.

Also, the microphones 131 to 134 and 141 to 144 correspond to the generators 111 to 114, respectively. That is, at least one of the generators 111 to 114 is set for each of the microphones 131 to 134 and 141 to 144. Here, the microphones 131 and 141 correspond to the generator 111, the microphones 132 and 142 correspond to the generator 112, the microphones 133 and 143 correspond to the generator 113, and the microphones 134 and 144 correspond to the generator 114.

The microphones 131 and 141 are arranged so as to correspond to the generator 111. Likewise, the microphones 132 and 142 are arranged so as to correspond to the generator 112, the microphones 133 and 143 are arranged so as to correspond to the generator 113, and the microphones 134 and 144 are arranged so as to correspond to the generator 114.

To be more specific, the microphones 131 and 141 are arranged between the inner and outer peripheral surfaces of the duct 121 corresponding to the generator 111. Likewise, the microphones 132 and 142 are arranged between the inner and outer peripheral surfaces of the duct 122 corresponding to the generator 112. Likewise, the microphones 133 and 143 are arranged between the inner and outer peripheral surfaces of the duct 123 corresponding to the generator 113. Likewise, the microphones 134 and 144 are arranged between the inner and outer peripheral surfaces of the duct 124 corresponding to the generator 114.

The microphones 131 and 141 acquire noise, as a sound, which is reduced by sounds outputted from the speakers 151 and 161. Therefore, each of the microphones 131 and 141 can also be expressed as an error microphone. The same goes for the other microphones 132 to 134 and 142 to 144.

Each of the speakers 151 to 154 and 161 to 164 is a device that acquires a signal, converts the acquired signal into a sound, and outputs the sound. That is, the speakers 151 to 154 and 161 to 164 each acquire a signal and outputs a sound indicated by the acquired signal.

Also, the speakers 151 to 154 and 161 to 164 correspond to the generators 111 to 114, respectively. That is, at least one of the generators 111 to 114 is set for each of the speakers 151 to 154 and 161 to 164. Here, the speakers 151 and 161 correspond to the generator 111, the speakers 152 and 162 correspond to the generator 112, the speakers 153 and 163 correspond to the generator 113, and the speakers 154 and 164 correspond to the generator 114.

The speakers 151 and 161 are arranged so as to correspond to the generator 111. Likewise, the speakers 152 and 162 are arranged so as to correspond to the generator 112, the speakers 153 and 163 are arranged so as to correspond to the generator 113, and the speakers 154 and 164 are arranged so as to correspond to the generator 114.

To be more specific, the speakers 151 and 161 are arranged closer to the generator 111 than the microphones 131 and 141 corresponding to the generator 111. That is, the distance from the generator 111 to the speakers 151 and 161 is shorter than the distance from the generator 111 to the microphones 131 and 141.

Likewise, the speakers 152 and 162 are arranged closer to the generator 112 than the microphones 132 and 142 corresponding to the generator 112. Also, the speakers 153 and 163 are arranged closer to the generator 113 than the microphones 133 and 143 corresponding to the generator 113. Moreover, the speakers 154 and 164 are arranged closer to the generator 114 than the microphones 134 and 144 corresponding to the generator 114.

Furthermore, the speakers 151 and 161 may be arranged inside or outside the airway of the duct 121 corresponding to the generator 111.

Likewise, the speakers 152 and 162 may be arranged inside or outside the airway of the duct 122 corresponding to the generator 112. The speakers 153 and 163 may be arranged inside or outside the airway of the duct 123 corresponding to the generator 113. The speakers 154 and 164 may be arranged inside or outside the airway of the duct 124 corresponding to the generator 114.

Here, the speakers 151 and 161 are arranged inside the airway of the duct 121 and fixed to the inner peripheral surface of the duct 121. Likewise, the speakers 152 and 162 are arranged inside the airway of the duct 122 and fixed to the inner peripheral surface of the duct 122. The speakers 153 and 163 are arranged inside the airway of the duct 123 and fixed to the inner peripheral surface of the duct 123. The speakers 154 and 164 are arranged inside the airway of the duct 124 and fixed to the inner peripheral surface of the duct 124.

The processor 170 is an electric circuit that processes information. To be more specific, the processor 170 generates a second signal according to a first signal outputted from each of the microphones 131 to 134 and 141 to 144. For example, the processor 170 acquires the first signal outputted from each of the microphones 131 to 134 and 141 to 144, through wired or wireless communication. Communication wires for the wired communication may be included in sidewalls of the ducts 121 to 124, the supporting structure, and the like.

Moreover, according to the first signal acquired from each of the microphones 131 to 134 and 141 to 144, the processor 170 generates a second signal indicating a sound for suppressing a sound indicated by the first signal. For example, the processor 170 generates a second signal indicating an antiphase sound of noise, according to the first signal. The antiphase sound of noise is, for example, a sound having a phase opposite to that of the noise and having a waveform obtained by inverting the waveform of the noise.

The processor 170 also outputs the second signal to each of the speakers 151 to 154 and 161 to 164. For example, the processor 170 outputs the second signal by transmitting the second signal to each of the speakers 151 to 154 and 161 to 164, through wired or wireless communication.

For example, the processor 170 outputs to the speaker 151 a second signal generated according to a first signal acquired from the microphone 131, and outputs to the speaker 161 a second signal generated according to a first signal acquired from the microphone 141. Then, the speaker 151 outputs a sound according to the second signal generated according to the first signal acquired from the microphone 131, and the speaker 161 outputs a sound according to the second signal generated according to the first signal acquired from the microphone 141.

To be more specific, for example, the processor 170 predicts noise to be generated by the generator 111, according to the first signal acquired from the microphone 131. More specifically, the processor 170 predicts the size, frequency, phase, and the like of the noise. Moreover, when the generator 111 is a rotor blade, the processor 170 may use the rotation speed of the rotor blade, and the like for noise prediction.

Then, the processor 170 outputs to the speaker 151 a second signal indicating an antiphase sound of the predicted noise. Accordingly, the microphone 131 acquires a synthetic sound of the noise generated by the generator 111 and the sound outputted from the speaker 151.

Thereafter, the processor 170 acquires a first signal indicating the synthetic sound from the microphone 131, and predicts noise to be generated by the generator 111, according to the first signal. This synthetic sound corresponds to a prediction error. The processor 170 predicts the noise so as to reduce the prediction error. For example, the processor 170 may change a parameter for predicting the noise from information such as the rotation speed of the rotor blade, according to the prediction error, and then predict the noise according to the changed parameter.

Subsequently, the processor 170 outputs to the speaker 151 a second signal indicating an antiphase sound of the predicted noise. The processor 170 repeatedly performs such processing.

The processor 170 may reflect the first signal acquired from the microphone 131 in generation of the second signal outputted to the speaker 161, or may reflect the first signal acquired from the microphone 141 in generation of the second signal outputted to the speaker 151. For example, the two first signals acquired from the microphones 131 and 141 may be averaged.

Then, the speakers 151 and 161 may output sounds according to second signals generated according to the first signal acquired from the microphone 131 and the first signal acquired from the microphone 141.

The same processing is performed for the other microphones 132 to 134 and 142 to 144 as well as for the other speakers 152 to 154 and 162 to 164. Thus, each of the speakers 151 to 154 and 161 to 164 acquires the second signal outputted from the processor 170 and outputs a sound indicated by the second signal. Therefore, the noise generated by the generators 111 to 114 is suppressed.

The technology to actively suppress noise with antiphase sound is also called active noise canceling (ANC). The first signal may be expressed as an error signal, while the second signal may be expressed as a control signal.

Moreover, noise microphones for acquiring noise to be used for the active noise canceling may be provided in addition to the microphones 131 to 134 and 141 to 144. The noise microphones are disposed, for example, at positions closer to the generators 111 to 114 than the speakers 151 to 154 and 161 to 164. Then, the processor 170 may predict noise by referring to signals obtained from the noise microphones, as reference signals. Alternatively, the processor 170 may predict noise using the rotation frequency and the like as described above, rather than using the noise microphones.

Moreover, the processor 170 may use two or more of the plurality of first signals acquired from the microphones 131 to 134 and 141 to 144 to generate one second signal. Two or more of the plurality of first signals may be averaged. Then, each of the speakers 151 to 154 and 161 to 164 may output a sound according to the one second signal generated using two or more of the plurality of first signals.

The unmanned flying object 100 also includes a communication device, and the processor 170 may perform wireless communication with an external device positioned outside the unmanned flying object 100, through the communication device. Then, the processor 170 may receive an operation signal for the unmanned flying object 100 through the communication device. Thereafter, the processor 170 may operate the generators 111 to 114 and the like according to the operation signal to fly the unmanned flying object 100.

The housing 180 is a structure for physically housing the processor 170. The housing 180 may further physically house a memory and the like. Note that the processor 170 may be housed in a component different from the housing 180. For example, the processor 170 may be housed in any of the ducts 121 to 124, the microphones 131 to 134 and 141 to 144 as well as the speakers 151 to 154 and 161 to 164. Thus, the unmanned flying object 100 may not include the housing 180.

Figure 3:
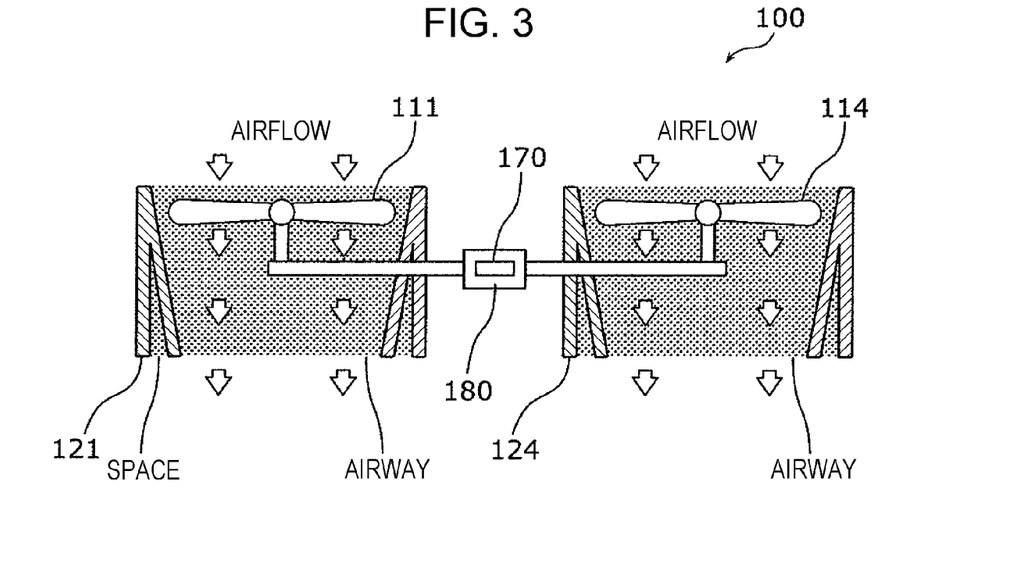
FIG. 3 is a cross-sectional view of the unmanned flying object according to the embodiment.

FIG. 3 is a cross-sectional view of the unmanned flying object 100 illustrated in FIG. 2. To be more specific, FIG. 3 conceptually illustrates the vertical cross-section of the generators 111 and 114 in the unmanned flying object 100 illustrated in FIG. 2. Since the generators 112 and 113 have basically the same cross-section as that of the generators 111 and 114, illustration of the cross-section of the generators 112 and 113 is omitted.

As illustrated in FIG. 3, the inner peripheral surface of the duct 121 has a tapered shape. That is, the closer to the downstream-side end of the duct 121, the smaller the inner diameter of the duct 121.

For example, the inner diameter of the duct 121 is reduced to the extent that the components of the force to fly the unmanned flying object 100 are properly obtained. To be more specific, it is assumed that, even when the inner diameter of the duct 121 is reduced to about 90% of the width of the airflow generated by the generator 111, the same force or more as that obtained when the inner diameter of the duct 121 is not reduced is obtained. Therefore, the inner diameter of the duct 121 may be reduced to about 90% to 95% of the width of the airflow generated by the generator 111.

Meanwhile, the outer peripheral surface of the duct 121 is basically kept constant. That is, the duct 121 has its outer diameter basically kept constant regardless of the proximity to the downstream-side end of the duct 121.

According to the shape as described above, the duct 121 can have a space between the inner and outer peripheral surfaces of the duct 121. This space has an opening at the downstream-side end of the duct 121. The ducts 122 to 124 also have the same shape as that of the duct 121.

Figure 4:
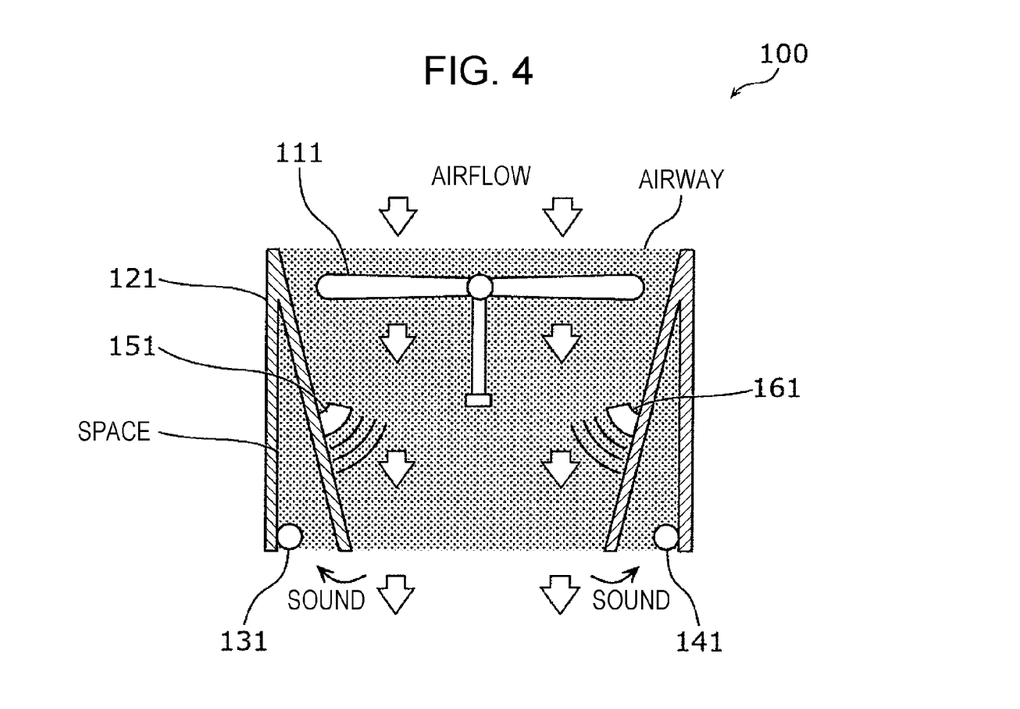
FIG. 4 is a cross-sectional view of a duct, illustrating arrangement of microphones, speakers, and the like according to the embodiment.

FIG. 4 is a cross-sectional view of the duct 121, illustrating the arrangement of the microphone 131, the speaker 151, and the like in the unmanned flying object 100 illustrated in FIG. 2. To be more specific, FIG. 4 is a vertical cross-sectional view of the duct 121 in the unmanned flying object 100 illustrated in FIG. 2, conceptually illustrating the cross-section including the microphones 131 and 141 and the speakers 151 and 161. As illustrated in FIG. 4, the microphones 131 and 141 are arranged in a space between the inner and outer peripheral surfaces of the duct 121.

The inner peripheral surface vibrates when an airflow hits against the inner peripheral surface. A vibration sound caused by such vibration may be picked up by the microphones 131 and 141. When the microphones 131 and 141 pick up the vibration sound, noise of the generator 111 is not properly acquired. Therefore, the microphones 131 and 141 are arranged closer to the outer peripheral surface with less vibration than the inner peripheral surface. To be more specific, the microphones 131 and 141 are arranged in a region where the distance to the outer peripheral surface is shorter than the distance to the inner peripheral surface.

In the example of FIG. 4, the microphones 131 and 141 are fixed to the outer peripheral surface. More specifically, the microphones 131 and 141 are physically connected to the sidewall of the outer peripheral surface of the duct 121. The microphones 131 and 141 may be fixed to the outer peripheral surface through a connector.

Alternatively, the microphones 131 and 141 may be arranged closer to the inner peripheral surface than to the outer peripheral surface, so that a sound that comes around to the space between the inner and outer peripheral surfaces of the duct 121 is more properly acquired. To be more specific, the microphones 131 and 141 may be arranged in a region where the distance to the inner peripheral surface is shorter than the distance to the outer peripheral surface. For example, the microphones 131 and 141 may be fixed to the inner peripheral surface. The microphones 131 and 141 may be fixed to the inner peripheral surface through a connector.

Moreover, the microphones 131 and 141 are arranged in the space between the inner and outer peripheral surfaces of the duct 121, in order to suppress the influence of the airflow passing through the airway of the duct 121, wind that relatively hits against the microphones as the unmanned flying object 100 moves, and the like.

For example, when the microphones 131 and 141 are arranged inside the airway of the duct 121 or the outside the outer peripheral surface of the duct 121, the microphones 131 and 141 are influenced by the airflow passing through the airway of the duct 121, the wind that relatively hits against the microphones as the unmanned flying object 100 moves, and the like. As a result, the microphones 131 and 141 may pick up wind noise. When the wind noise is picked up by the microphones 131 and 141, noise generated by the generator 111 is not properly acquired.

For this reason, the microphones 131 and 141 are arranged in the space between the inner and outer peripheral surfaces of the duct 121, as described above.

Also, the microphones 131 and 141 are arranged at positions corresponding to the downstream-side end of the duct 121 in the space between the inner and outer peripheral surfaces of the duct 121, so that a sound that comes around to this space is more properly acquired. To be more specific, the microphones 131 and 141 may be arranged within a predetermined range from the downstream-side end of the duct 121. This predetermined range may be, for example, about 10% of the length of the duct 121.

Meanwhile, the speakers 151 and 161 are arranged closer to the generator 111 than the microphones 131 and 141. For example, the speakers 151 and 161 are arranged so as to be fixed to the inner peripheral surface of the duct 121. The speakers 151 and 161 may be fixed to the inner peripheral surface of the duct 121 through a connector. Also, the speakers 151 and 161 may be fixed to a supporting structure connected to the generator 111. Moreover, the speakers 151 and 161 may be fixed to the supporting structure connected to the generator 111, through a connector.

The noise generated by the generator 111 is collected in the airflow direction by the duct 121 on the downstream side of the airflow. Then, the speakers 151 and 161 can properly cancel the noise by outputting antiphase sounds of the noise collected in the airflow direction. Also, since the inner diameter of the duct 121 is reduced along the airflow direction, the noise is approximated to a point sound source. Therefore, the noise can be properly canceled by the antiphase sound of the noise.

The speakers 151 and 161 may output sounds along the airflow direction. For example, the speakers 151 and 161 are directional, and each set a direction with higher sound intensity, when outputting a sound, as an output direction of the sound. The speakers 151 and 161 may be arranged such that the output directions coincide with the airflow direction. Thus, the speakers 151 and 161 can properly cancel the noise collected in the airflow direction.

The generator 111 basically generates force in a direction toward above the unmanned flying object 100 and generates airflows in a direction toward below the unmanned flying object 100. Thus, it is assumed that, during the flight of the unmanned flying object 100, there is a greater influence of the noise below the unmanned flying object 100 than above the unmanned flying object 100. That is, it is assumed that there is a greater influence of the noise on the downstream side of the unmanned flying object 100 than on the upstream side thereof.

The speakers 151 and 161 can cancel the noise assumed to have great influence by canceling the noise collected in the airflow direction by the duct 121 on the downstream side of the airflow.

Furthermore, in this example, the duct 121 is configured such that a portion thereof corresponding to the downstream side of the generator 111 is longer than a portion thereof corresponding to the upstream side of the generator 111. On the other hand, the duct 121 is configured such that the portion thereof corresponding to the upstream side of the generator 111 is shorter than the portion thereof corresponding to the downstream side of the generator 111. Thus, the increasing of the weight of the unmanned flying object 100 is suppressed.

Note that the speakers 151 and 161 may be integrated into one speaker. For example, when the generator 111 is a rotor blade, one speaker may be disposed on the extension of the rotation axis of the rotor blade in the airway of the duct 121. It is assumed that the airflow is weak at such a position. Therefore, negative effects caused by the airflow hitting against the speaker are reduced.

At the same time, the microphones 131 and 141 may also integrated into one microphone. For example, the processor 170 may generate a second signal according to a first signal acquired from one microphone, and the speakers 151 and 161 may each output a sound according to the generated second signal.

The above description is given of the configurations of the generator 111, the duct 121, the microphones 131 and 141, and the speakers 151 and 161. The generators 112 to 114, the ducts 122 to 124, the microphones 132 to 134 and 142 to 144, and the speakers 152 to 154 and 162 to 164 have the same configurations as those described above.

Figure 5:
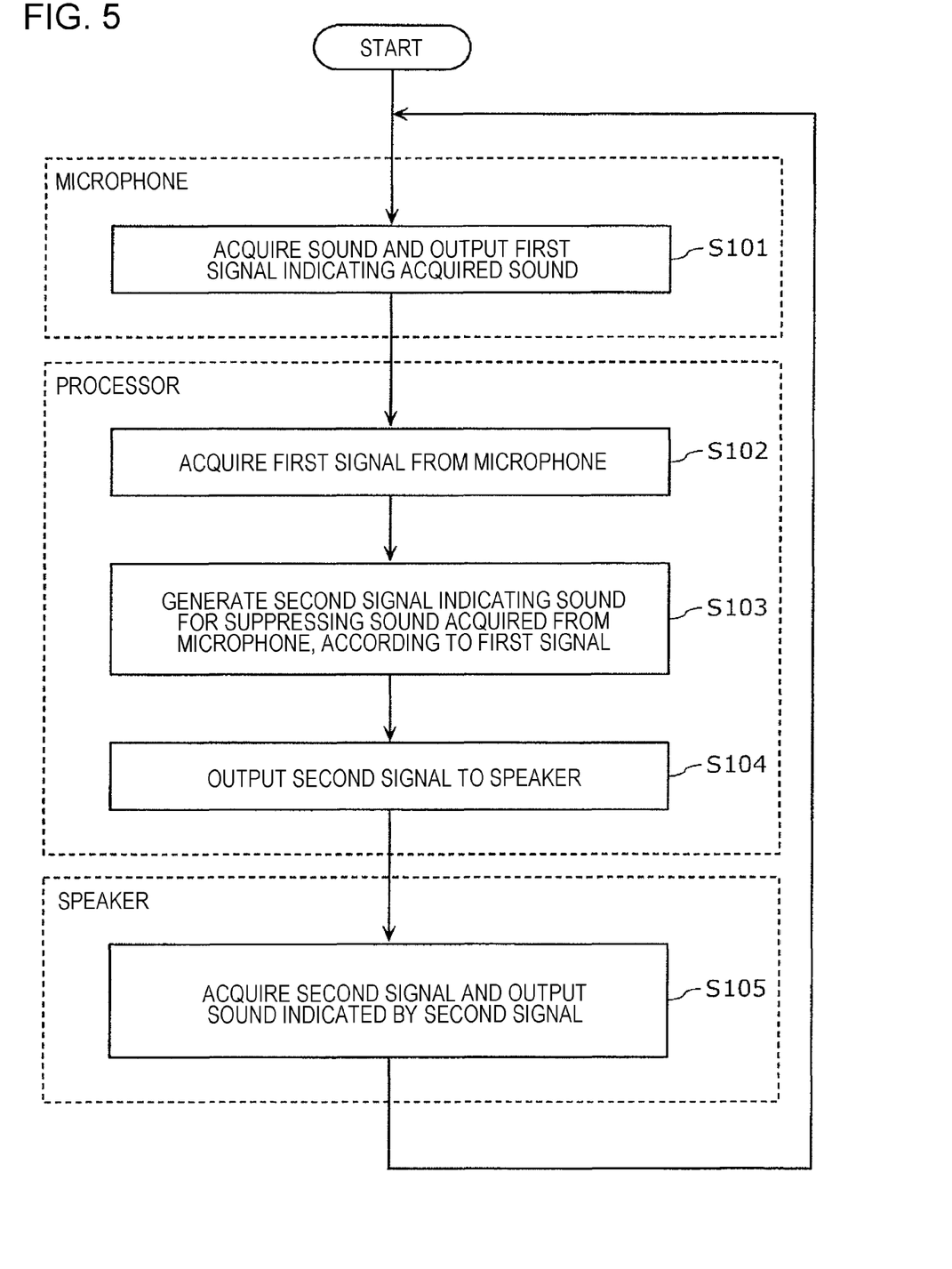
FIG. 5 is a flowchart illustrating operations of the unmanned flying object according to the embodiment.

FIG. 5 is a flowchart illustrating operations of the unmanned flying object 100 illustrated in FIG. 2. The plurality of components included in the unmanned flying object 100 perform the operations illustrated in FIG. 5.

First, each of the microphones 131 to 134 and 141 to 144 in the unmanned flying object 100 acquires a sound, and outputs a first signal indicating the acquired sound (S101). For example, each of the microphones 131 to 134 and 141 to 144 outputs the first signal by transmitting the first signal to the processor 170.

Next, the processor 170 in the unmanned flying object 100 acquires the first signal from each of the microphones 131 to 134 and 141 to 144 (S102). For example, the processor 170 acquires the first signal by receiving the first signal from each of the microphones 131 to 134 and 141 to 144.

Then, the processor 170 generates a second signal according to the first signal acquired from each of the microphones 131 to 134 and 141 to 144 (S103).

For example, the processor 170 generates a second signal indicating a sound for suppressing a sound acquired by the microphone 131, according to the first signal acquired from the microphone 131. To be more specific, the processor 170 predicts noise generated by the generator 111, according to the first signal acquired from the microphone 131. Then, the processor 170 generates a second signal indicating an antiphase sound of the predicted noise as the sound for suppressing the sound acquired by the microphone 131.

The processor 170 also performs such processing for the microphones 132 to 134 and 141 to 144.

Thereafter, the processor 170 outputs the second signal to each of the speakers 151 to 154 and 161 to 164 (S104). For example, the processor 170 outputs the second signal by transmitting the second signal to each of the speakers 151 to 154 and 161 to 164.

To be more specific, the processor 170 outputs the second signal generated according to the first signal acquired from the microphone 131, to the speaker 151 corresponding to the microphone 131. The processor 170 also performs such processing for each of the speakers 152 to 154 and 161 to 164 corresponding to the microphones 132 to 134 and 141 to 144, respectively.

Subsequently, each of the speakers 151 to 154 and 161 to 164 in the unmanned flying object 100 acquires the second signal from the processor 170, and outputs a sound indicated by the second signal (S105). For example, each of the speakers 151 to 154 and 161 to 164 acquires the second signal by receiving the second signal from the processor 170, and outputs the sound indicated by the second signal.

To be more specific, the speaker 151 acquires a second signal outputted to the speaker 151 from the processor 170, and outputs a sound indicated by the second signal. Again, each of the speakers 152 to 154 and 161 to 164 performs such processing.

The unmanned flying object 100 repeats the above processing (S101 to S105). For example, the processor 170 in the unmanned flying object 100 acquires a prediction error of noise according to the first signal. Then, the processor 170 predicts the noise so as to reduce the prediction error. Thereafter, the processor 170 outputs a second signal indicating an antiphase sound of the noise predicted so as to reduce the prediction error. Thus, the unmanned flying object 100 can reduce the noise.

Note that FIG. 1 and the like illustrate one rotor blade having one rotation plane and one rotary shaft as each of the four generators 111 to 114. However, one generator may include a plurality of rotor blades. The plurality of rotor blades may have a plurality of rotation planes different from each other or may have a plurality of rotary shafts different from each other.

Here, the rotor blade has at least one blade, and the rotation thereof generates force in a direction along the rotary shaft and generates an airflow in a direction opposite to the direction of the force generated. This at least one blade may be considered as the rotor blade. The rotor blade is also called a blade, a rotor or a propeller. Moreover, at least one rotor blade can also be expressed as a rotor blade set.

Each of the generators 111 to 114 may be a jet engine, a rocket engine or the like, rather than the rotor blade.

Although the unmanned flying object 100 includes the four generators 111 to 114 in the above example, the unmanned flying object 100 may include three generators or less, or may include five generators or more. Likewise, although the unmanned flying object 100 includes the four ducts 121 to 124 in the above example, the unmanned flying object 100 may include three ducts or less, or may include five ducts or more.

Likewise, although the unmanned flying object 100 includes the eight microphones 131 to 134 and 141 to 144 in the above example, the unmanned flying object 100 may include seven microphones or less, or may include nine microphones or more. Likewise, although the unmanned flying object 100 includes the eight speakers 151 to 154 and 161 to 164 in the above example, the unmanned flying object 100 may include seven speakers or less, or may include nine speakers or more.

The processor 170 may include a plurality of subprocessors. That is, a plurality of processors may be used as the processor 170. Alternatively, the processor 170 may be a multiprocessor.

The unmanned flying object 100 may include an antenna for wireless communication, or may include a wireless communication circuit. The processor 170 may serve as a wireless communication circuit for wireless communication. The unmanned flying object 100 may include an energy source such as a power source to operate the respective components, or may be connected to an external power source. For example, even during the flight of the unmanned flying object 100, the unmanned flying object 100 may be connected to the ground power through a cable and may be supplied with power through the cable.

As for the speakers 151 to 154 and 161 to 164, the output direction of sounds does not have to coincide with the airflow direction. Each of the speakers 151 to 154 and 161 to 164 may output a sound in a direction different from the airflow direction. Thus, noise can be suppressed in the output direction of the sound. Moreover, the noise can also be suppressed in the airflow direction by diffusing the outputted sound.

For example, omnidirectional speakers also called nondirectional speakers may be arranged as the speakers 151 to 154 and 161 to 164.

The unmanned flying object 100 includes the four ducts 121 to 124 corresponding one-on-one to the four generators 111 to 114 in the above example, but may include one duct corresponding to a plurality of generators. Also, the unmanned flying object 100 may include one duct, one microphone, and one speaker corresponding to a plurality of generators.

The unmanned flying object 100 may include one microphone and one speaker corresponding to each generator or each duct. Alternatively, the unmanned flying object 100 may include at least three microphones and at least three speakers corresponding to each generator or each duct. For example, at least three microphones and at least three speakers may be arranged so as to surround airflows.

In the above example, the generator 111, the duct 121, the microphones 131 and 141, and the speakers 151 and 161 can be considered to be related to each other and correspond to each other.

Likewise, the generator 112, the duct 122, the microphones 132 and 142, and the speakers 152 and 162 can be considered to correspond to each other. Also, the generator 113, the duct 123, the microphones 133 and 143, and the speakers 153 and 163 can be considered to correspond to each other. Moreover, the generator 114, the duct 124, the microphones 134 and 144, and the speakers 154 and 164 can be considered to correspond to each other.

A plurality of components that can be considered to correspond to each other such as those described above may be expressed as one set.

The unmanned flying object 100 is not limited to outputting an antiphase sound of noise according to the noise, but may output a sound that diminishes noise according to the noise. For example, the unmanned flying object 100 may output a sound such as music at about the same volume as the noise.

As for the ducts 121 to 124 described above, the airway is narrowed concentrically in the airflow direction. However, the airway does not have to be narrowed concentrically. For example, the airway may be partially narrowed in the portions where the microphones 131 to 134 and 141 to 144 are disposed.

The unmanned flying object 100 does not have to be symmetrical. For example, front and rear may be set for the unmanned flying object 100. Then, the unmanned flying object 100 may include the microphones 131 to 134 and 141 to 144 at the rear only so as to suppress the influence such as vibration caused by wind that hits from the front.

A plurality of modified examples of the above embodiment are described below. In each of the modified examples, description of substantially the same configuration as that in the above embodiment may be omitted.

First Modified Example

In an unmanned flying object according to this modified example, microphones positioned between inner and outer peripheral surfaces of a duct are fixed to the duct through connectors.

Figure 6:
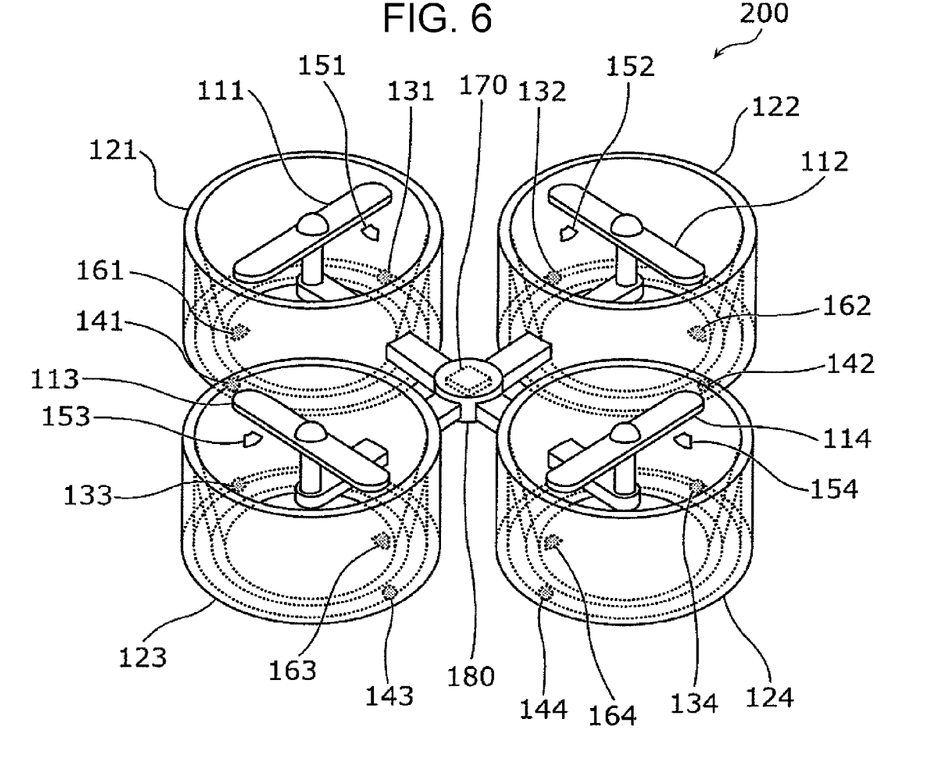
FIG. 6 is a partial perspective view illustrating a configuration of an unmanned flying object according to a first modified example.

FIG. 6 is a partial perspective view illustrating a configuration of the unmanned flying object according to this modified example. An unmanned flying object 200 according to this modified example includes the same components as those of the unmanned flying object 100 according to the above embodiment. More specifically, the unmanned flying object 200 includes generators 111 to 114, ducts 121 to 124, microphones 131 to 134 and 141 to 144, speakers 151 to 154 and 161 to 164, a processor 170, and a housing 180.

Figure 7:
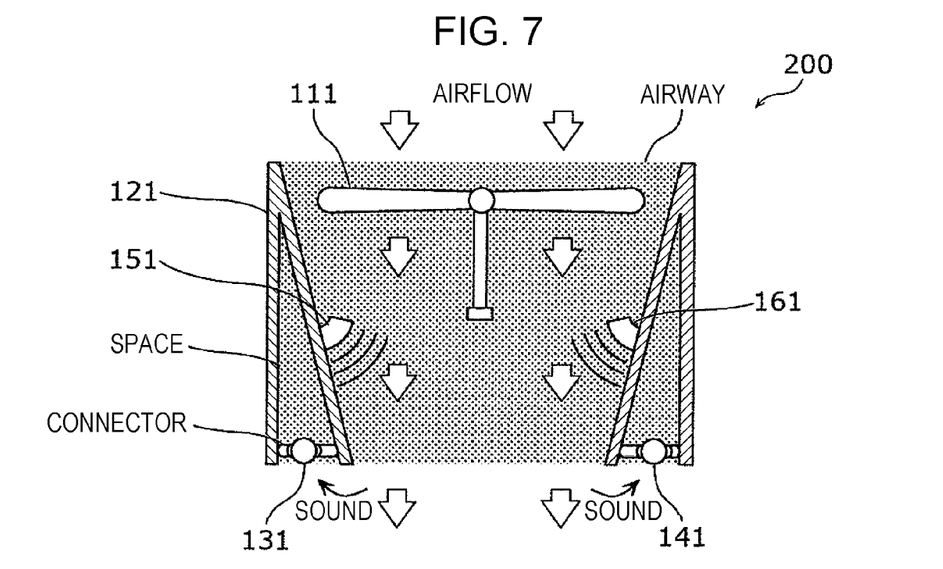
FIG. 7 is a cross-sectional view of a duct, illustrating a connection mode of the duct and microphones according to the first modified example.

FIG. 7 is a cross-sectional view of the duct 121, illustrating a connection mode of the microphone 131 and the like in the unmanned flying object 200 illustrated in FIG. 6. To be more specific, FIG. 7 is a vertical cross-sectional view of the duct 121 in the unmanned flying object 200 illustrated in FIG. 6, conceptually illustrating the cross-section including the microphones 131 and 141 and the speakers 151 and 161. As illustrated in FIG. 7, the microphones 131 and 141 are arranged in a space between the inner and outer peripheral surfaces of the duct 121.

It is assumed that the duct 121 vibrates due to an airflow through an airway, external wind or the like. A vibration sound caused by such vibration may be picked up by the microphones 131 and 141. When the microphones 131 and 141 pick up the vibration sound, noise generated by the generator 111 is not properly acquired. Therefore, in this modified example, the microphones 131 and 141 are fixed to the outer or inner peripheral surface of the duct 121 through connectors, rather than being fixed directly to the outer or inner peripheral surface of the duct 121, so as to suppress the influence of the vibration of the duct 121.

Thus, the microphones 131 and 141 are arranged so as to float in the space between the outer and inner peripheral surfaces of the duct 121. Therefore, the influence of the vibration of the duct 121 on the microphones 131 and 141 is suppressed.

The microphones 131 and 141 may be fixed to one of the outer and inner peripheral surfaces of the duct 121 through connectors, or may be fixed to the outer and inner peripheral surfaces of the duct 121, respectively, through connectors. That is, the microphones 131 and 141 are physically connected, through connectors, to a sidewall of at least one of the outer and inner peripheral surfaces of the duct 121. In the example of FIG. 7, the microphones 131 and 141 are fixed to both of the outer and inner peripheral surfaces through connectors.

The connectors described above may be dampers. More specifically, the connectors described above may be elastic bodies. Thus, the influence of the vibration of the duct 121 on the microphones 131 and 141 is more properly suppressed. To be more specific, elastic bodies such as springs and rubber may be used as the connectors. Alternatively, elastic bodies such as elastic fiber may be used as the connectors. Note that, even when the connectors are not elastic bodies, the use of the connectors might suppress direct influence of the vibration of the duct 121.

Figure 8:
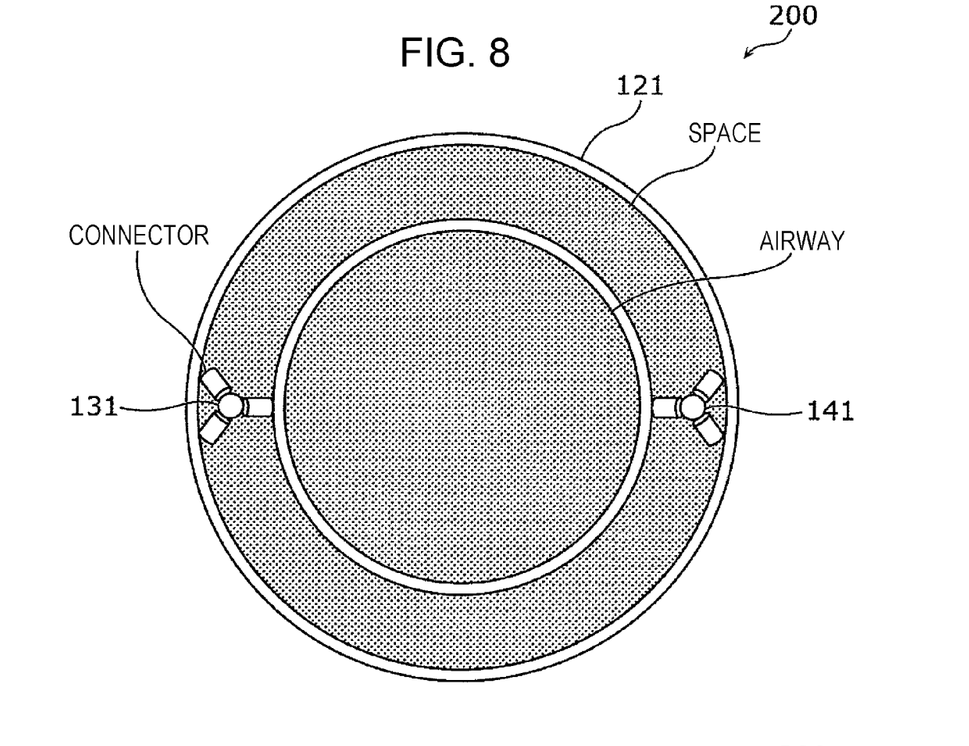
FIG. 8 is another cross-sectional view of the duct, illustrating the connection mode of the duct and the microphones according to the first modified example.

FIG. 8 is another cross-sectional view of the duct 121, illustrating the connection mode of the microphone 131 and the like in the unmanned flying object 200 illustrated in FIG. 6. To be more specific, FIG. 8 is a horizontal cross-sectional view of the duct 121 in the unmanned flying object 200 illustrated in FIG. 6, conceptually illustrating the cross-section including the microphones 131 and 141.

As illustrated in FIG. 8, the microphone 131 is fixed at three spots in this modified example. To be more specific, the microphone 131 is fixed at two spots on the outer peripheral surface and one spot on the inner peripheral surface through three connectors. This connection mode is merely an example. The microphone 131 may be fixed at one spot, two spots, or at least four spots. A connection mode for the microphone 141 is also the same as the connection mode for the microphone 131.

Moreover, a connection mode for the microphones 132 to 134 and 142 to 144 is also the same as the connection mode for the microphones 131 and 141.

Second Modified Example

An unmanned flying object according to this modified example includes one generator, one duct, one microphone, and one speaker.

Figure 9:
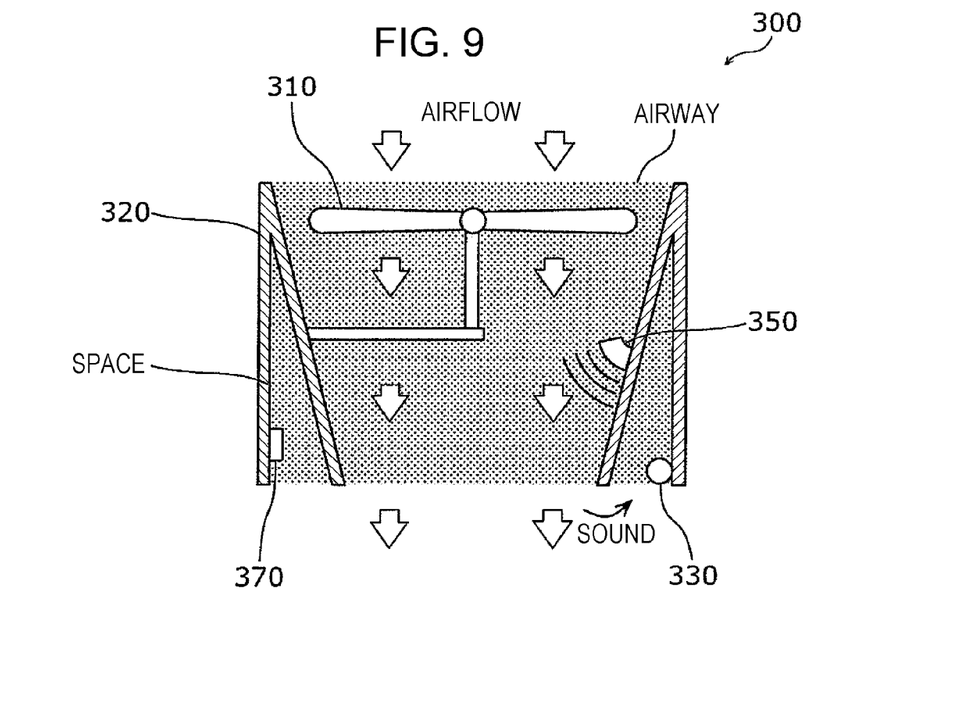
FIG. 9 is a configuration diagram illustrating an unmanned flying object according to a second modified example.

FIG. 9 is a configuration diagram illustrating the unmanned flying object according to this modified example. To be more specific, FIG. 9 is a vertical cross-sectional view of an unmanned flying object 300, conceptually illustrating a configuration of the unmanned flying object 300 according to this modified example. As illustrated in FIG. 9, the unmanned flying object 300 according to this modified example includes a generator 310, a duct 320, a microphone 330, a speaker 350, and a processor 370.

Each of a plurality of components in the unmanned flying object 300 according to this modified example corresponds to at least one component among the plurality of components in the unmanned flying object 100 according to the above embodiment. Therefore, each of the plurality of components in the unmanned flying object 300 has basically the same features as those of at least one corresponding component in the unmanned flying object 300.

To be more specific, the generator 310 corresponds to the generators 111 to 114, the duct 320 corresponds to the ducts 121 to 124, the microphone 330 corresponds to the microphones 131 to 134 and 141 to 144, and the speaker 350 corresponds to the speakers 151 to 154 and 161 to 164. Also, the processor 370 corresponds to the processor 170.

In this modified example, the duct 320 covers the generator 310. The generator 310 and the speaker 350 are enclosed in an airway of the duct 320. The microphone 330 and the processor 370 are enclosed in a space between inner and outer peripheral surfaces of the duct 320. Then, according to a sound acquired by the microphone 330, the processor 370 outputs an antiphase sound of predicted noise from the speaker 350.

Thus, the unmanned flying object 300 according to this modified example can properly acquire noise and can properly suppress the noise. Furthermore, the number of components in the unmanned flying object 300 is reduced, and thus resource wasting is reduced.

Note that each of the generators 111 to 114 in the unmanned flying object 100 according to the above embodiment generates components of force to fly the unmanned flying object 100. The generator 310 in the unmanned flying object 300 according to this modified example also generates components of force to fly the unmanned flying object 300, but these components can be considered as the force itself to fly the unmanned flying object 300.

The first and second modified examples may be combined. To be more specific, the microphone 330 in the second modified example may be fixed to at least one of the inner and outer peripheral surfaces of the duct 320 through a connector, as in the case of the first modified example.

While the modes of the unmanned flying object have been described above based on the above embodiment and the like including the modified examples, the present disclosure is not limited to the above embodiment and the like. Modifications conceived by those skilled in the art may be made to the above embodiment and the like, or the plurality of components in the above embodiment and the like may be arbitrarily combined.

For example, processing executed by a specific component in the above embodiment and the like may be executed by another component instead of the specific component. Also, the order of processing steps may be changed, or a plurality of processing steps may be concurrently executed.

Moreover, the ordinal number such as first and second used in the description may be replaced as needed. Furthermore, the ordinal number may be newly attached to or removed from the component or the like.

A pure material or a mixture may be used for each structure in the above embodiment and the like. For example, metal, resin, wood or any other material may be used. Moreover, the position of each component may be a central position of the component or a main position of the component.

The upstream side corresponds to the side opposite to the airflow direction, while the downstream side corresponds to the side of the airflow direction. For example, when the airflow direction is the downward direction, the upstream side is the upper side and the downstream side is the lower side. Moreover, the end of the airflow direction means the terminal end of the airflow direction. For example, the end of the airflow direction of the duct means the terminal end of the airflow direction of the duct.

Although the description is given of the example where the speaker is disposed within the airway of the duct in the above embodiment, the speaker may be disposed outside the outer peripheral surface of the duct. For example, the speaker may be disposed on the outer peripheral surface of the duct or at the end of the airflow direction of the duct.

Hereinafter, description is given of a basic configuration of an unmanned flying object according to one aspect of the present disclosure, and of typical modified examples and the like. These may be combined with each other or may be combined with a part of the above embodiment and the like.

(1) An unmanned flying object (100, 200, 300) according to one aspect of the present disclosure includes at least one generator (111 to 114, 310), at least one duct (121 to 124, 320), at least one microphone (131 to 134, 141 to 144, 330), at least one speaker (151 to 154, 161 to 164, 350), and a processor (170, 370).

The at least one generator (111 to 114, 310) generates force to fly the unmanned flying object and generates an airflow. The processor (170, 370) generates a second signal according to a first signal outputted from the at least one microphone.

Each duct (121 to 124, 320) covers each generator corresponding to each duct, and passes the airflow in an airflow direction that is a direction in which the airflow is generated by each generator. Each duct (121 to 124, 320) has a space between inner and outer peripheral surfaces of each duct, the space having an opening at the end of the airflow direction of each duct. The shape of the inner peripheral surface of each duct (121 to 124, 320) is a tapered shape corresponding to the airflow direction.

Each microphone (131 to 134, 141 to 144, 330) is positioned in the space between the inner and outer peripheral surfaces of each duct corresponding to each microphone. Each speaker (151 to 154, 161 to 164, 350) is positioned closer to each generator corresponding to each speaker than each microphone corresponding to each speaker, and outputs a sound according to the second signal.

Accordingly, in the unmanned flying object (100, 200, 300), the microphone is disposed at a position where wind noise is unlikely to be picked up. Moreover, the microphone does not have to be disposed outside the duct. Therefore, the unmanned flying object (100, 200, 300) can suppress an increase in overall size while having a configuration to reduce noise.

(2) For example, in the unmanned flying object (100, 200, 300), the position of each microphone (131 to 134, 141 to 144, 330) corresponds to a position at the end of the airflow direction in the space between the inner and outer peripheral surfaces of each duct corresponding to each microphone.

Accordingly, in the unmanned flying object (100, 200, 300), the microphone is disposed at a position that is easily reached by noise and where wind noise is unlikely to be picked up. Therefore, the unmanned flying object (100, 200, 300) can use active noise canceling to more clearly acquire noise to be suppressed.

(3) For example, in the unmanned flying object (100, 200, 300), each microphone (131 to 134, 141 to 144, 330) is positioned in a region where the distance to the outer peripheral surface is shorter than the distance to the inner peripheral surface in the space between the inner and outer peripheral surfaces of each duct corresponding to each microphone.

Accordingly, in the unmanned flying object (100, 200, 300), the microphone is disposed at a position away from the inner peripheral surface of the duct. The inner peripheral surface of the duct is likely to vibrate with the airflow. Therefore, when the microphone is disposed at a position close to the inner peripheral surface of the duct, a vibration sound may be picked up by the microphone, and thus the noise to be suppressed may be mixed with the vibration sound. The unmanned flying object (100, 200, 300) can suppress the above vibration sound from being picked up by the microphone and thus can more clearly acquire the noise to be suppressed.

(4) For example, in the unmanned flying object (100, 200, 300), each microphone (131 to 134, 141 to 144, 330) is fixed, through a connector, to at least one of the inner and outer peripheral surfaces of each duct corresponding to each microphone.

Accordingly, in the unmanned flying object (100, 200, 300), the vibration of the duct becomes less likely to be transmitted to the microphone, and thus the vibration sound of the duct is suppressed from being picked up by the microphone. Therefore, the unmanned flying object (100, 200, 300) can use active noise canceling to more clearly acquire the noise to be suppressed.

(5) For example, in the unmanned flying object (100, 200, 300), the connector is an elastic body. Accordingly, in the unmanned flying object (100, 200, 300), the vibration of the duct is further suppressed from being transmitted to the microphone, and thus the vibration sound of the duct is further suppressed from being picked up by the microphone. Therefore, the unmanned flying object (100, 200, 300) can use active noise canceling to more clearly acquire the noise to be suppressed.

(6) For example, in the unmanned flying object (100, 200, 300), each microphone (131 to 134, 141 to 144, 330) is fixed to the outer peripheral surface of each duct corresponding to each microphone. Accordingly, in the unmanned flying object (100, 200, 300), the microphone is fixed to the outer peripheral surface that is less likely to vibrate than the inner peripheral surface. Therefore, the unmanned flying object (100, 200, 300) can suppress the vibration sound from being picked up by the microphone, and can use active noise canceling to more clearly acquire the noise to be suppressed.

The present disclosure can be utilized to suppress noise of an unmanned flying object and to reduce weight of the unmanned flying object, and is also applicable to an unmanned flying object and the like that fly in a quiet environment.

What is claimed is:

1. An unmanned flying object, comprising:
   a duct
   at least one generator that generates force to fly the unmanned flying object and generates airflow;
   at least one microphone; and
   at least one speaker; and
   a processor that generates a second signal according to a first signal outputted from the at least one microphone, wherein
   the duct covers the at least one generator in a direction perpendicular to an airflow direction that is a direction in which the airflow is generated by the at least one generator, passes the airflow in the airflow direction, includes a space between an inner peripheral surface and an outer peripheral surface, and defines an opening at the end of the space in the airflow direction,
   a shape of the inner peripheral surface of the duct is tapered in the airflow direction,
   the at least one microphone is positioned in the space of the duct, and
   the at least one speaker is positioned closer to the at least one generator than the at least one microphone, and outputs a sound according to the second signal.

2. The unmanned flying object according to claim 1, wherein
   a position of the at least one microphone corresponds to a position in the space at the end of the duct in the airflow direction.

3. The unmanned flying object according to claim 1, wherein
   the at least one microphone is positioned in a region of the space where a distance to the outer peripheral surface is shorter than a distance to the inner peripheral surface.

4. The unmanned flying object according to claim 1, wherein
   the at least one microphone is fixed, through a connector, to at least one of the inner peripheral surface and the outer peripheral surface of the duct.

5. The unmanned flying object according to claim 4, wherein
   the connector is an elastic body.

6. The unmanned flying object according to claim 1, wherein
   the at least one microphone is fixed to the outer peripheral surface of the duct.

7. The unmanned flying object according to claim 1, further comprising:
   a plurality of ducts.

8. The unmanned flying object according to claim 1, wherein
   a length of the duct in the airflow direction is one-third to twice a width of the duct in the direction perpendicular to the airflow direction.

9. The unmanned flying object according to claim 1, wherein
   the opening defined by the duct at the end of the space in the airflow direction is completely opened.

10. The unmanned flying object according to claim 1, wherein
    the opening defined by the duct at the end of the space in the airflow direction is partially opened.

11. The unmanned flying object according to claim 1, wherein
    the at least one speaker is positioned inside an airway of the duct.

12. The unmanned flying object according to claim 1, wherein
    the at least one speaker is positioned outside an airway of the duct.

13. A duct assembly for an unmanned flying object, the duct assembly comprising:
    a duct;
    at least one generator that generates force to fly the unmanned flying object and generates airflow;
    at least one microphone; and
    at least one speaker,
    the duct covers the at least one generator in a direction perpendicular to an airflow direction that is a direction in which the airflow is generated by the at least one generator, passes the airflow in the airflow direction, includes a space between an inner peripheral surface and an outer peripheral surface, and defines an opening at the end of the space in the airflow direction, a shape of the inner peripheral surface of the duct is tapered in the airflow direction, the at least one microphone is positioned in the space of the duct, and the at least one speaker is positioned closer to the at least one generator than the at least one microphone, and outputs a sound according to a signal.

\* \* \* \* \*